United States Patent [19]

Knowles et al.

[11] Patent Number: 4,823,212

[45] Date of Patent: Apr. 18, 1989

[54] SAMPLED SERVO CODE FORMAT AND SYSTEM FOR A DISC DRIVE

[75] Inventors: Vernon L. Knowles; Robert E. Kier, both of Boise, Id.

[73] Assignee: Hewlett-Packard Company, Palo Alto, Calif.

[21] Appl. No.: 935,663

[22] Filed: Nov. 26, 1986

[51] Int. Cl.$^4$ .............................................. G11B 5/58
[52] U.S. Cl. ............................. 360/77.08; 360/78.14; 360/135
[58] Field of Search ...................... 360/77, 78, 75, 135

[56] References Cited

U.S. PATENT DOCUMENTS

| | | | |
|---|---|---|---|
| 4,297,734 | 10/1981 | Laishley et al. | 360/77 |
| 4,297,737 | 10/1981 | Andresen et al. | 360/77 |
| 4,412,165 | 10/1983 | Case et al. | 360/77 |
| 4,424,543 | 1/1984 | Lewis et al. | 360/78 |
| 4,511,938 | 4/1985 | Betts | 360/135 |
| 4,516,162 | 5/1985 | West | 360/77 |
| 4,524,398 | 6/1985 | Fujiki | 360/78 |
| 4,530,019 | 7/1985 | Penniman | 360/135 |
| 4,551,776 | 11/1985 | Roalson | 360/77 |
| 4,602,304 | 7/1986 | Fultz | 360/78 |

*Primary Examiner*—Alan Faber
*Assistant Examiner*—David L. Robertson
*Attorney, Agent, or Firm*—Leslie G. Murray

[57] ABSTRACT

The system and method for normalizing the amplitude of servo code derived signals in a disc drive, includes an improved embedded servo code format of separate magnetic dibit fields, recorded in half track steps. One magnetic dibit field is an automatic gain control field in which the magnetic head sees the same amount of magnetic dibit regardless of its position with respect to the track. A fast settling AGC loop responding to signals from the AGC field, produces a gain adjust signal while the magnetic head is still in the AGC field, which is used to normalize the amplitude of all following servo code and data code signals in that sector. The cycle of automatic gain control is repeated for each track in each sector. A sector mark following the AGC field has a magnetic dibit pattern which is fault tolerant. It is transduced in three parts to minimize error in its detection and identification and provides a timing reference for servo signals which follow. A defect dibit is recorded if the following servo gap is found to be defective during manufacture so that the next servo gap may be ignored. A track position servo code field provides signals for track following.

9 Claims, 8 Drawing Sheets

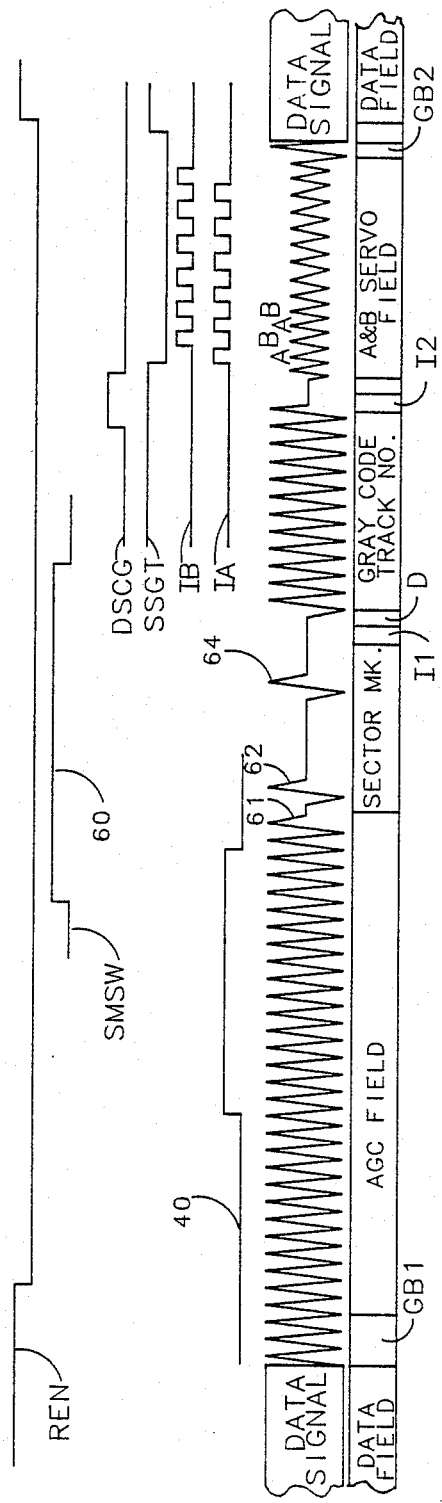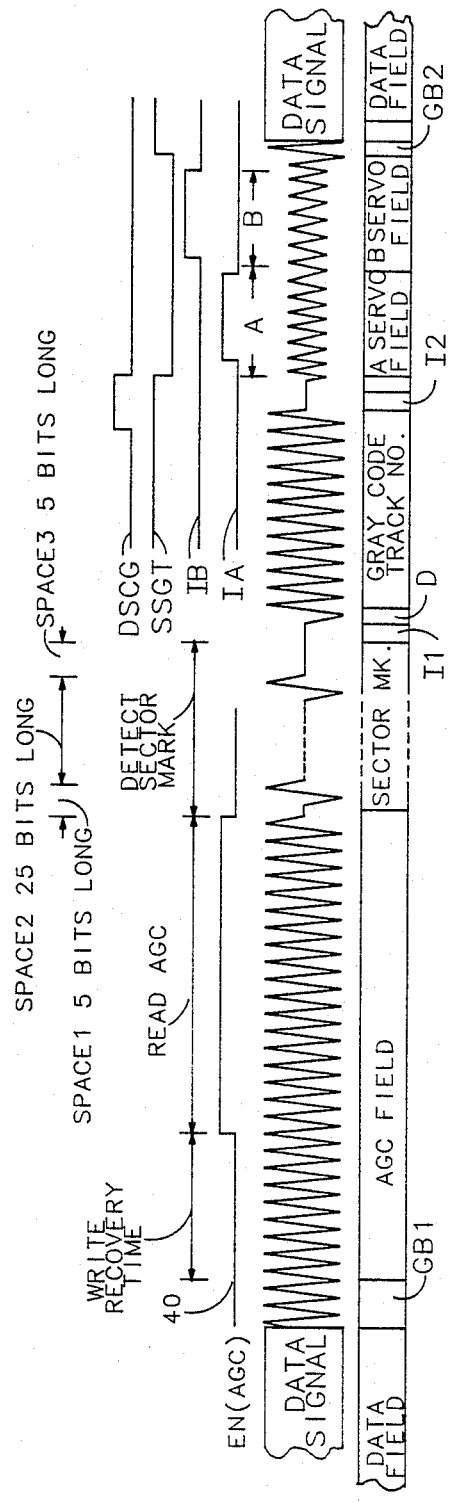

SAMPLED SERVO CODE FORMAT AND SYSTEM FOR A DISC DRIVE

BACKGROUND OF THE INVENTION

1. Field of the Invention

This invention relates to improvements in disc memory drives and, more particularly, to improvements in system and methods and sampled servo code formats for a magnetic disc drive.

2. Description of the Prior Art

Magnetic disc storage systems, called disc drives, provide large volumns of accessible memory. These conventionally comprise a stack of memory discs mounted in axially spaced positions on a common spindle to be rotated at constant speed. The discs have data recorded in concentric circular tracks on each disc surface. Corresponding tracks on the disc surfaces are cylindrically aligned. Magnetic heads on a moveable carriage, there being one head for each disc surface, are radially and circumferentially aligned, to be moved as a group to position a selected head at a selected track for reading or writing at that track location.

The tracks are each divided into equal radially aligned sectors, aligned from disc to disc. Each sector has a servo code recording at its beginning, read by the magnetic head for use by the servo in driving the carriage and head for track following and track seeking operations.

The U.S. Pat. No. 4,424,543 to Lewis et al., provides prerecorded servo data in a section at the beginning of each sector in each track, which comprises the sequence of an erase gap, a preamble, a sector mark, a track number, a check code, and a track position code. User data follows the sector at each track. The erase gap function is to provide a time synchronization. The preamble provides clock synchronization. The sector mark is used as an additional verification of servo timing. The track numbers are used for track seeking. The check code is used to check for clock shift. The track position code is used for track centering. The code transitions in the track position code are written to equally overlap adjacent tracks and to be offset in time. When a head is on track center, the signals from transitions on one side of the track are equal to the signals from the transitions on the other side of the track, which is recognized by the servo as a track centered condition. The track position code is the only servo code written to overlap adjacent tracks.

In providing the described servo code format, Lewis et al, are concerned with provisions for accurately transducing the servo code, for detecting time shift errors and for minimizing the possibility of data overwrite into the embedded servo code, as discussed with respect to FIG. 2. The disclosure concentrates on track identification and a clock shift. Nothing is said about provisions for automatic gain control.

The U.S. Pat. No. 4,530,019 to Penniman, also provides prerecorded servo data in a section at the beginning of each sector in each track, which comprises the sequence of an erase gap, an automatic gain control field and A & B bursts of servo control information for track centering purposes. Automatic gain control is described as follows: "Inclusion of the AGC circuits (not illustrated) allows the AGC burst of the pattern to be monitored and retained for use to adjust the gain of the circuitry used to process the head transducer output of servo information and also data to accommodate variations in the disk storage media. This is particularly useful to provide noise immunity if the disk is to be read by a disc drive other than the one on which it was created". Nothing further is said about automatic gain control, especially AGC code formatting, or the details of a system for processing and using signals from the AGC field.

SUMMARY OF THE INVENTION

Acceptable servo system function in a disc drive requires careful control of signal gain. Although Penniman mentions automatic gain control, and its use, as noted above, the thrust of his teaching for a control for the fine positioning of a transducer head of a disc drive unit rests upon the establishment of time references based on the transition between the erased gap and an AGC burst together with a servo code decoding technique for fine positioning of the transducer head. Neither Penniman nor Lewis et al treat automatic gain control as a factor requiring attention.

The present invention provides improvement over the U.S. patents to Lewis et al and Penniman, in servo gain control, in one of its aspects, in the provision of a servo code format having an automatic gain control field for controlling servo gain variations, which may vary from head to head, from track to track and from track sector to track sector. Provisions for servo gain control are necessary to provide relatively uniform servo gain, at least in the circumstances described, if acceptable servo performance is to be achieved.

In practicing this invention, according to this one of its aspects, a memory disc is divided into equal sectors. Each sector comprises a section of servo code called a servo gap which is located at the beginning of the sector. The servo gap is divided into sections which comprise, proceeding from its leading edge, an automatic gain control section, a sector mark section, a gray code track number section and a track position section.

The four named sections in the servo gap are individually defined by magnetic dibit recordings in predetermined patterns. These magnetic dibits are also known as magnetic transitions or magnetic zones. The surface of the magnetic disc is magnetized uniformly in one direction. The dibits are magnetically poled in the opposite direction, providing a transition in the magnetic field at the leading and trailing dibit edges during scanning by a magnetic head.

The magnetic dibits have a width measured across the tracks approximately equal to one-half of a track. All of the magnetic dibits in the servo gap are the same and are recorded in half track positions on each side of the center line of each of the tracks. They are written or recorded in half-track steps with a magnetic head having a width of two dibits, which corresponds to the width of a data track. Their patterns, when scanned in a direction along the tracks, determine the information which is recorded and which will be sensed by a magnetic head scanning the track. Using this recording track technique the center line of a track is defined between either the confronting ends (aligned) or the adjacent ends (A & B sevo field) of the magnetic dibits in half-track positions on each side of each tack.

The magnetic dibits on one side of alternate tracks are consistently referred to as the A dibits and the magnetic dibits on the other side of the alternate tracks are consistently referred to as the B dibits. These are reversed on the tracks intermediate to the alternate tracks. This radially aligns the adjacent A and B magnetic dibits. The difference of the A and B signals developed in a magnetic head which is scanning a track in the track position section of the servo gap, is used by the servo to position that magnetic head at track center. The sum of the A and B signals developed in a magnetic head is used for servo gain compensation purposes, during both reading and writing modes of disc drive use. The guard bands are provided at the leading and trailing edges of the servo gap to provide space for preventing overwriting of data into the servo gap at the leading edge, and, at the trailing edge to switch the head from a mode providing signals to the servo to a mode providing for reading or writing of data code.

The signals derived from the automatic gain control field are peak detected in a fast settling AGC loop and normalized as to amplitude as a step in maintaining substantially uniform servo gain. This as an important feature for reliably reading of the servo code especially the sector mark which follows. Detection of the sector mark establishes an exact timing reference with the track number and track position servo code that follow it.

The sector mark signals are threshold detected at about one-half the level of the peak detection of the AGC signals. The sector mark pattern is designed to be fault tolerant and is read in three parts, called space 1, space 2, and space 3, using bit counters and an algorithum providing for bit count testing in each sector mark space. By this expedient, positive recognition of a sector mark is assured.

Track identification is provided using track numbers recorded in Gray code. The Gray code is also recorded using the half-track dibit recording technique. The track number signals are threshold detected and used in track seeking operations as a feedback signal to the servo which is responding to a requested track number. This eliminates the need for seeking inner and outer track guard bands as a reference for track counting purposes.

Track position servo code, also recorded using the half-track dibit recording technique, follows the track number code in the servo gap. The A dibits are recorded on one side of each track and the B dibits are recorded on the opposite side of each track. Due to the half-track recording technique the A and B dibits swap track sides and are radially aligned in adjacent half-track positions. These are formatted in two different magnetic dibit patterns. In one pattern, the individual A and B dibits alternate in circumferential phase position on opposite sides of the tracks. In the other pattern, the A dibits are recorded in groups of dibit strings or bursts on one side of each track and the B dibits are recorded in groups of dibit strings or bursts on the other side of each track. The A and B dibit groups alternate in circumferential phase position on opposite sides of the tracks. When a head is track centered over the track position servo code, the A and B signal amplitudes are equal. The A and B signals are processed in an AGC loop coupled to a servo for providing servo control signals which maintain servo gain substantially uniform. The difference in the processed A and B signals is used by the servo for track following purposes.

BRIEF DESCRIPTION OF THE DRAWINGS

FIG. 6a and 6b illustrate the relationship of timing signals, with the idealized servo code signals of FIGS. 4 & 5, respectively;

DESCRIPTION OF THE PREFERRED EMBODIMENTS

Figure 1:
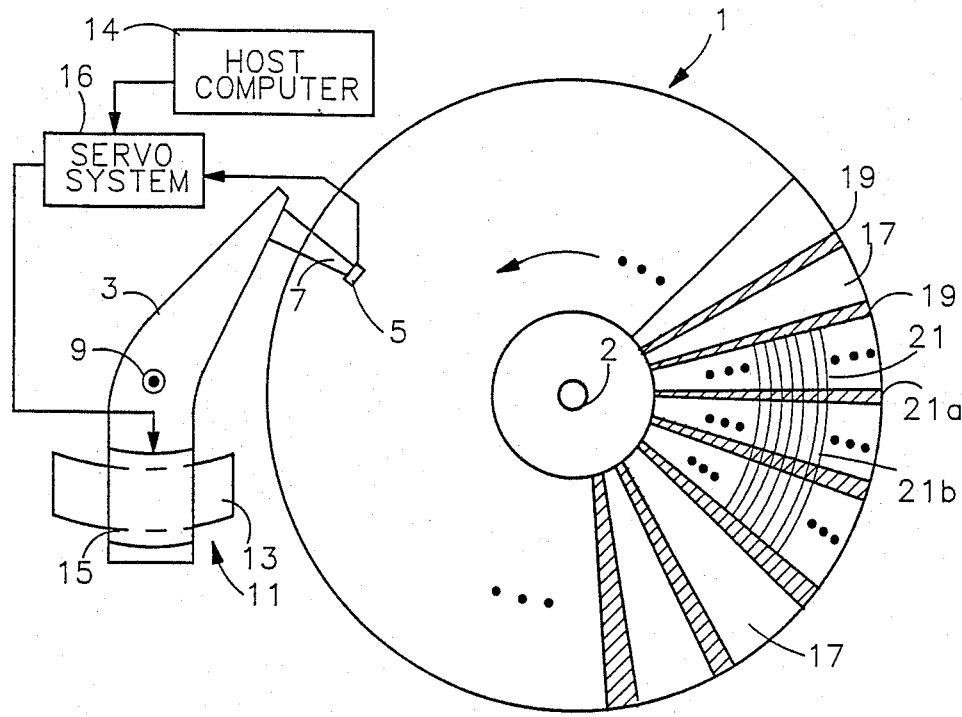
FIG. 1 is a partial map of the surface of a memory disc.

FIG. 1 illustrates the essential parts of a disc drive for present purposes, comprising a disc 1, a pivotally mounted armstack or carriage 3 and a magnetic head 5 on the end of a flexure assembly 7 which is attached to the end of the armstack or carriage 3. A disc drive typically includes a plurality of discs 1 which are axially spaced on a spindle and rotated in a counter clockwise direction, as viewed, at constant speed. Magnetic heads 5 are positioned on each side of each disc by the carriage 3 and the flexure assembly 7. The carriage 3 may be part of either a linear or a rotary actuator system for moving the heads across the disc to different track positions. A rotatably mounted carriage is shown having a pivot mount 9. An actuator member 11 comprises a fixed, arcuate magnet structure 13 and a coil 15 on one end of the carriage 3 which is magnetically coupled to the magnet. In the servo mode of operation, for either track seeking or track following purposes, a servo system 16 is connected to a selected magnetic head 5 to receive signals therefrom for the purpose of controlling the actuator member 11 to which the output of the servo is connected. A host computer 14 provides requests to the servo system, such as track numbers, in accessing information in the disc drive for computing or data processing functions.

The improved formatting of the servo code in the memory disc is useful in sampled servo systems of the type described in co-pending application Ser. No. 919,099 entitled "Method And Apparatus For An Improved Sampled Servo Seek And Track Follow Disc Drive", filed Oct. 14, 1986 and assigned to the assignee of this invention. As described in that application, proper formatting of the servo code on the disc, including the use of track numbers to identify individual tracks, obviates the need for a dedicated servo disc. This reduces system complexity, in that switching of the servo between present, dedicated, and target heads is eliminated, among other reasons.

The disc 1 is divided into a plurality of sectors 17 which are equal in size. Only a few of these sectors are illustrated for present purposes, one being detailed. Each sector 17 comprises a servo gap 19. The servo gaps 19 associated with individual concentric circular tracks 21 are radially aligned, as shown. The section of each track extending through a servo gap has servo code recorded therein. The section of each track following its servo gap in a particular sector has data recorded therein useful in data processing functions or in computer functions.

Figure 2:
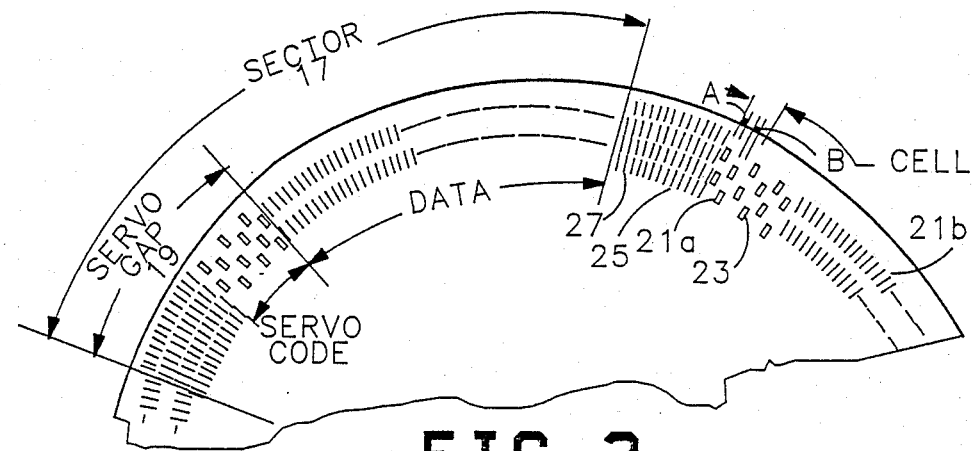
FIG. 2 is a plan view of a sector of a memory disc, fragmentarily illustrating magnetically recorded tracks.

FIG. 2 is a further development of FIG. 1, drawn to an enlarged scale, illustrating additional details. Only two concentric tracks are shown. Enlargement permits showing additional details of the servo code in a servo gap 19 as seen in the servo gap on the right in FIG. 2. The servo code is recorded along track sections 21a in a servo gap, and comprises a track position servo code section 23, a track number section 25, and a section 27 comprising primarily an area of automatic gain control with a small guard band GB1 (not shown here) at the front. Two types of track position servo code are described in this disclosure. The track position servo code shown here comprises magnetic zones or dibits A and B in circumferentially spaced positions on opposite sides of the track center line, overlapping roughly one-half of a track on each side of a track center line 21a. The magnetic dibits B are in circumferential positions intermediate the magnetic dibits A, that is, they alternate in circumferential phase position. The magnetic dibits in the section 25 defining the track numbers are also recorded in half-track positions on each side of a track center line 21a, as are the magnetic dibit recordings in the automatic gain control section 27. When the discs rotate, track position signals are developed in the selected magnetic head when the dibits of the track position servo code 23 pass therebeneath. These signals are useful in determining the radial position of the magnetic head in relation to the magnetic zones or dibits A and B and, hence, track center.

Figure 3A:
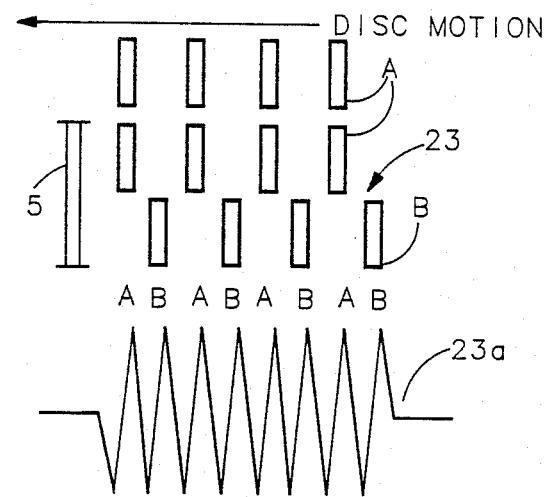
FIG. 3a is an enlarged plan view of a fragment of the magnetic zones or dibits of one format of a sampled track position servo code defining a track and a typical processed, track centered, track following signal which is shown therebelow.
Figure 4:
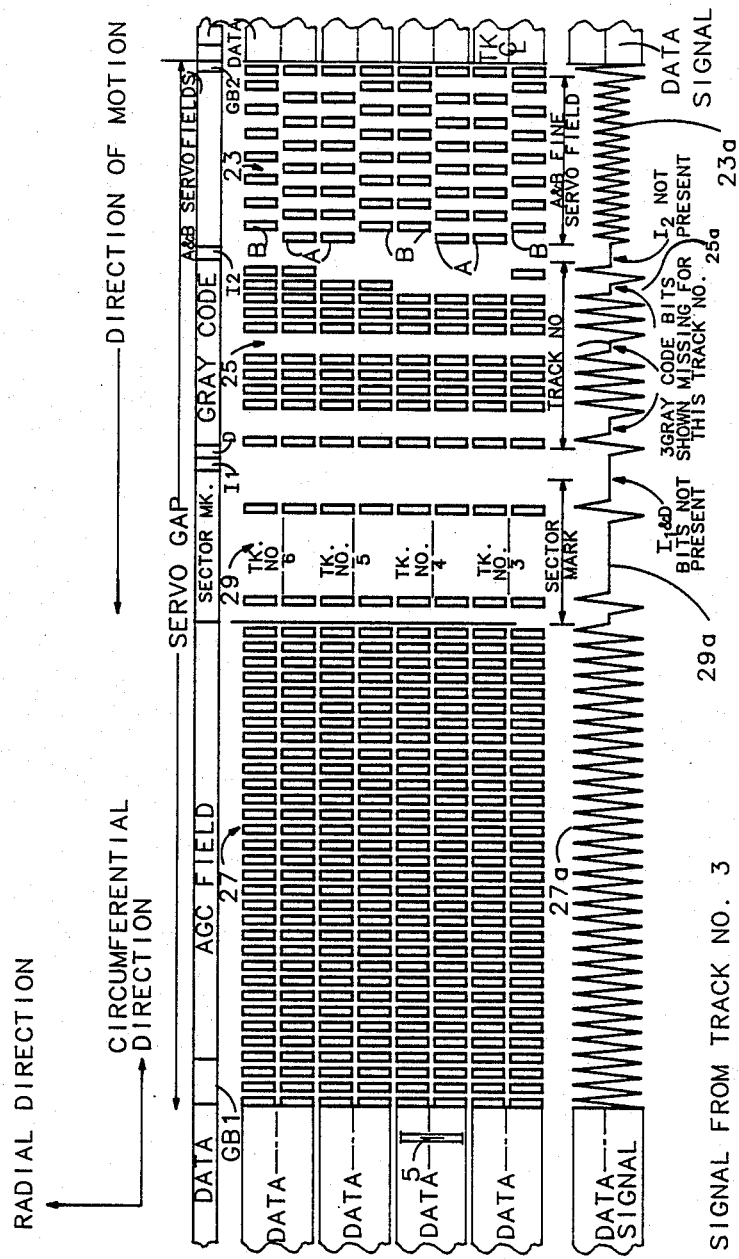
FIG. 4 is a rectilinear enlargement of the servo gap portion of one disc sector, illustrating the formatting of the servo code magnetic dibits and idealized signals derived therefrom.

FIG. 3a is an enlarged view of a modified fragment of the track position servo code 23 of FIG. 2, as will be developed in FIG. 4. A magnetic head 5 is shown on the left in this figure in track centered position. The surface of the disc, represented in the plane of the drawing, is of one magnetic polarity. The magnetic zones or dibits are of the opposite magnetic polarity. Disc motion from right to left, as viewed, beneath the magnetic head 5, generates track position servo code voltages in the magnetic head, which after amplification and processing, are characterized by the time varying track position servo code waveforms A and B shown in FIG. 3a. The difference between the A and B dibits voltages (A−B), which is integrated, indicates the radial position of the magnetic head with respect to the track center and is used in the track following mode of operation for keeping the magnetic head track-centered. When the difference between the A and B signals is zero, the magnetic head is track-centered. The use of the signals A and B in track following and in track seeking operations in a sampled servo type of track seeking and track following servo system, is described hereinafter. Such use is also described in the referenced co-pending application, above, which is incorporated herein by reference. Other ways in which these A and B signals are used in track seeking and track following operations are known in the prior art. See the patents to Lewis et al and Penniman, above.

Figure 3B:
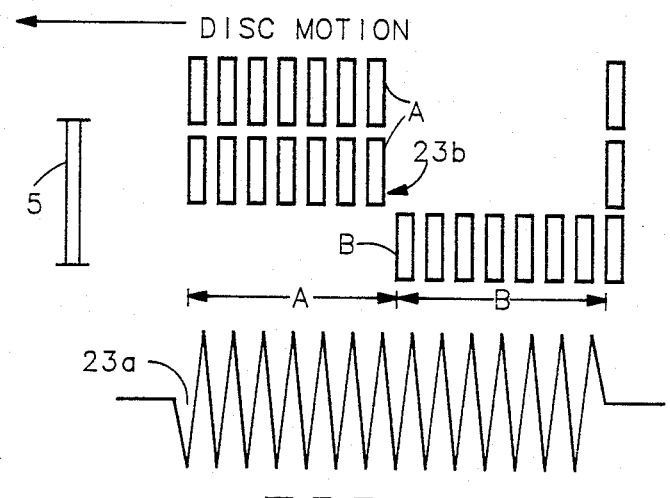
FIG. 3b is similar to FIG. 3a, illustrating a presently preferred format of a sampled, track position servo code.

FIG. 3b illustrates a presently preferred track position servo code format. The A and B magnetic dibits are again recorded in half-track positions, but now they are in strings or bursts comprising, for example, strings of seven dibits in alternating circumferential phase positions on opposite sides of the track. The signal waveform generated when the magnetic head 5 scans this dibit format has the same appearance as that of FIG. 3a, but the individual waveform peaks, instead of resulting from the alternate sensing of the A and B dibits, now results from alternate sensing of A and B dibit strings or bursts, resulting in waveform group A and waveform group B. Here, again, the difference between the A and B voltages indicates the radial position of the magnetic head with respect to track center. Processing of the A and B voltages for both formats will be described at a later point.

Figure 5:
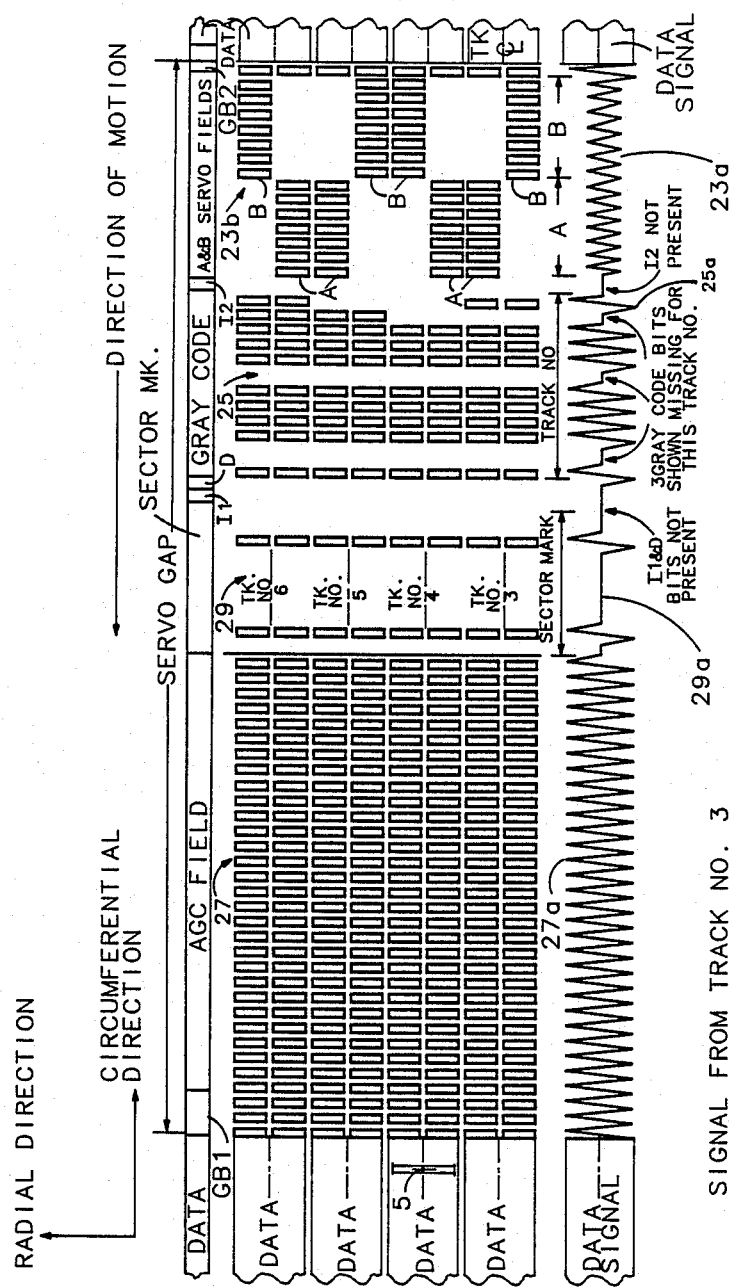
FIG. 5 is similar to FIG. 4, illustrating a presently preferred track position servo code format in the servo gap (The A and B dibit groups)

FIGS. 4 and 5 are enlarged, rectilinear developments of servo gaps according to this invention, each showing recordings of the magnetic dibits for 4 adjacent disc tracks which have been arbitrarily numbered, tracks three, four, five, and six. FIG. 4 shows the track position servo code format of FIG. 3a and FIG. 5 shows the track position servo code format of FIG. 3b.

The direction of disc motion in each figure is indicated at the top of the drawing. The radial and circumferential directions with respect to the disc are also indicated. Additional information with respect to the servo gap is evident in each figure. Proceeding from the leading edge of the servo gap which is at the left side of each figure, as indicated, each servo gap comprises a first guard band, GB1, an automatic gain control section or field, 27, a sector mark section or field, 29, which is the same for all sectors, an index bit, I1, a defect bit, D, a track number section, 25, recorded in Gray code, a second index bit, I2, and the A and B track position servo code field 23. Each servo gap ends with a guard band section GB2. Data tracks appear on each side of the servo gaps. Each illustrated servo gap is part of the sector which includes the data tracks on the right of the servo gap.

Guard bands, GB1 and GB2, are write splice areas that account for disc rotational speed variations so that the servo code is not overwritten y the user data. The guard band, GB1, during a write operation initiates the interruption of the writing operation at its leading edge and, thereby prevents overwriting into the AGC field.

Figure 7:
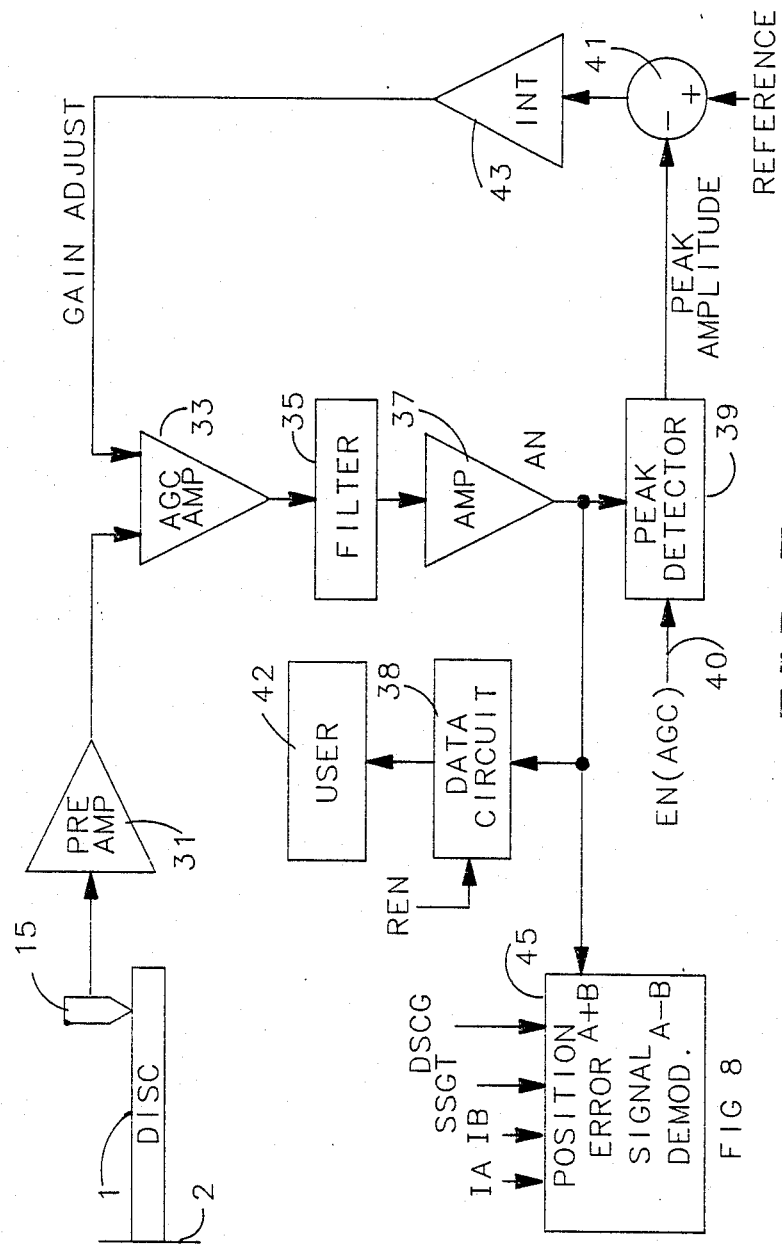
FIG. 7 is a block diagram of an automatic gain control circuit.

The automatic gain control field, 27 is detected, (in response to the signals from the magnetic head) by a fast settling automatic gain control loop, FIG. 7, that normalizes the signal amplitudes so that subsequent servo gap fields can be properly detected and processed. This is particularly important if a head switch has just occurred which could result in a significant change in signal amplitude. The automatic gain control field, 27, is also used for automatic gain control for data detection circuits.

In automatic gain control, the signal amplitude is normalized. Except for magnetic dibit pattern differences (circumferential dibit spacing) for the purpose of identifying track numbers, sector marks and track positions, the automatic gain control field is recorded at substantially the same density as the Gray code and the fine servo field (track position servo code). In transducing these magnetic fields, the Gray code field, for example, is transduced at half the voltage threshold of the threshold used for the automatic gain control field, so that detection of the Gray code track number will change when the magnetic head is half off-track.

The sector mark, 29, also detected at half the peak voltage of the AGC field, is a special bit pattern that establishes an exact timing reference with the servo signals that follow it. This eliminates the need for a phase locked loop that normally is used on dedicated servo disc drives or as in sampled servo drives such as used in Lewis et al, above. The sector mark pattern (FIGS. 6a and 6b) is designed to be fault tolerant so that it can be correctly identified even in the presence of a disc defect. It is also used to control disc rotational speed by timing the interval between sector marks.

Index bits, I1 and I2, are redundant bits used to identify a sector called the index sector. Only one sector on each track has transistions or dibits written into bit cells, I1 and I2. This is a sector zero, for example. The redundancy provides immunity to disc defects and identifies a selected sector as the initial sector on the disc from which other sector locations are determined.

The defect bit, D, is a bit cell that has a dibit written into it, if the next, or following, servo gap has been determined to be defective. This bit is written into the format at the time of manufacture of the disc when the servo code is being tested. Any servo gap which happens to contain a disc defect can be marked defective by writing the bit D into the previous servo gap. This bit informs the servo demodulator electronics to ignore the next servo gap. The data field in the sector associated with that servo gap can be processed normally.

The gray coded track number section or field 25, is a set of magnetic dibits that contain the track address for the track that the head is presently flying over. These are binary addresses that are encoded into a Gray code sequence so that any decoding uncertainty is limited to plus or minus one-half track. In using Gray code, only one bit in the track identification number changes from track to track, as shown. The track addresses are read and decoded even during a track seeking operation. In fact, it is these track addresses that are used to provide track position feedback to control the seek operation. In practice, a host computer may be employed to program retrieval and writing of information in the disc drive. In this respect, the host computer 14 (FIG. 1) makes requests in the form of particular track numbers which are to be accessed. The present track address or number where the magnetic head is located provides the feedback signal which is used in this seek operation.

The track position servo code, 23, also called the A and B fine servo fields, comprises magnetic dibit recordings that are recorded in one-half track positions on each side of the data track center line. In FIG. 4, the individual B dibit recordings on one side of a track center line are circumferentially spaced in positions which are intermediate the individual A dibit recordings on the opposite side of that track center line. In FIG. 5 the B groups or strings of dibit recordings on one side of a track centerline are circumferentially spaced in positions which are intermediate the A groups or strings of dibit recordings on the opposite side of that track centerline. As noted above, when the amplitudes of the processed A and B signals, developed by magnetic head transition of the track position servo code are equal, that magnetic head is exactly positioned over the centerline of that particular data track. These signals are used to provide feedback control for the servo system 16 for track following purposes.

The use of the automatic gain control section or field in the servo gap provides a basis for developing an inexpensive servo system. By placing the automatic gain control field in the front of each servo gap and by making the automatic gain control response time fast enough to settle within the period of time in which the automatic gain control field is scanned by the magnetic head, the automatic gain control voltage can be determined. This voltage, called a gain adjustment voltage herein, is held fixed until the next servo gap is reached and is used to normalize the amplitudes of all signals derived from servo and data code in the sector containing that servo gap.

Attention is directed to the fact that the magnetic dibits in all of the sections or fields within the servo gap are the same and are recorded in half-track positions on each side of the indicated track, using a magnetic head twice the width of a dibit and recording dibits in half-track steps. The result is a magnetic field pattern, in the automatic gain control field, as seen in FIGS. 4 and 5, between the centers of tracks numbered 3, 4, 5 and 6, for example, in which: the magnetic dibits are radially disposed of the tracks, have a radial length less than one-half the distance between the centers of adjacent tracks, are radially positioned in pairs in spaced end-to-end relationship between and spaced from the centers of adjacent tracks, and, on opposite sides of the centers of the tracks are circumferentially spaced, to form magnetic dibit fields of differing formats or patterns. A magnetic head 5 in the automatic gain control field due to the uniformity and density of the dibit pattern sees the same amount of magnetic dibit whether it is track centered, whether it is off center from a track, or whether it is involved in a track seeking operation crossing tracks as it traverses the AGC field. This solves the problem of achieving good automatic gain control when the servo is being switched from one magnetic head to another. By this half-track recording technique in which the fields on adjacent tracks are written coherently, the magnetic head reads properly even when it is in a position between the tracks; thus, this arrangement also provides a proper automatic gain control function during a seek operation.

This arrangement also avoids the problem of having to settle the automatic gain control function during the performance of a head switching operation, or seek operation, or both, at the same time that the heads are trying to settle on a particular track. This problem exists in systems in which the automatic gain control and the position loops are interacting loops.

By formatting the automatic gain control field or section, as indicated above, the servo signal formed by summing A+B can be held constant or relatively constant.

The signal train depicted at the bottom of each of FIGS. 4 and 5 is idealized. Each shows the amplitude of the pattern of the signals developed in the different fields or sections of the servo gap as it is scanned by the magnetic head. The signal patterns relate to the bottom track, called track number 3. A track centered position of the magnetic head 5 is shown but the signal patterns transduced from the AGC field are valid for both on-track and off-track positions. The peak amplitudes of the signals are relatively constant in all sections. As discussed above, it is desirable to detect the signal 25a, representing a track number, at half the peak amplitude of the automatic gain control signals. By so doing, there is a confidence that existing signal bits will be counted and that signal levels, where bits are missing, will not be counted. Also the track number changes as the magnetic head crosses a half-track position.

In the track position servo field, the signal amplitudes are relatively constant and they are roughly half the peak amplitude of the signals in the other servo fields; the reason being that in track centered position the magnetic head 5 overlaps one-half of the dibits A and B at different times.

FIGS. 6a and 6b relate a set of timing signals to the servo code signals of FIGS. 4 and 5, respectively. These are rectangular wave signals that enable selected functions in transducing the servo code. An enable signal EN(AGC) controls the time interval in which the AGC field may be read. As seen in FIGS. 6a and 6b, a write recovery interval is provided as the head enters the AGC field, followed by a read interval which terminates at or within the end of the AGC field. The signals IA and IB gate the A and B signals, individually, FIG. 6a, or in groups, FIG. 6b, in sequence for processing to form the signals A−B and A+B, as will be described. More particularly, in FIG. the signals IA and IB are synchronized with the individual A and B voltage peaks, respectively. In FIG. 6b, the signals IA and IB are synchronized with the A and B signal groups and provide respective read intervals less than the respective intervals of the A and B signal groups, to avoid signal losses at the beginning and end of the individual signal groups. The IA and IB signals are gated by a sampled servo gate signal SSGT when it is in the lower of its two voltage states. A discharge signal DSCG is provided which, in the higher of its two voltage states, discharges individual integrating amplifiers to which the signals A and B are gated, as will be described. Circuits for producing the timing signals are well known, see the patent to Lewis et al.

Provision for detecting a sector mark is described herein. As seen in FIG. 6b a sector mark 35 bits long is employed to illustrate this feature. Other bit lengths may be used. The sector mark is divided into three spaces. Space 1 at the beginning of the sector mark is 5 bits long. Central space 2 is 25 bits long and ending space 3 is 5 bits long. This bit pattern identifies that it is a sector mark and is used in determining that the sector mark has been found, as will be seen in the flow chart of FIG. 8.

A fast settling AGC circuit for performing the automatic gain control function is illustrated in FIG. 7. Here, the electrical output of the magnetic head 5 traversing the servo gap is amplified in a preamplifier 31, the output of which is coupled as one input to an automatic gain control amplifier 33. The output of this amplifier is filtered by a filter circuit 35, the output of which is applied to an amplifier 37. The output signals AN of the amplifier 37 are peak detected by a peak detector 39, controlled by the enable AGC signal 40 (ENAGC), the output of which is differentially compared with a reference AGC signal having the desired amplitude. The difference signal is integrated by an integrater 43 which produces and stores a gain adjust signal coupled as feedback in the loop to the second input of the AGC amplifier 33. This gain adjust signal exists through out the scanning of the present sector which includes the remainder of the servo gap and the data field. The AGC cycle starts over again as the magnetic head scans the next AGC field in the next servo gap in the presence of the signal 40 (ENAGC).

The gain adjust feedback signal functions either to increase or decrease the output of the AGC amplifier 33 in a sense to balance the peak amplitude output of the peak detector with the peak amplitudes of the reference AGC signal during the AGC interval (ENAGC). Thus in scanning the automatic gain control field 27 at the front end of the servo gap, an automatic gain control function is achieved. When the sampled servo gating signal SSGT is in the lower of its two voltage states the amplitude normalized servo signals, AN, are coupled to a position error signal demodulator 45, FIG. 8, in the input of the servo system 16, FIG. having its own A+B automatic gain control function. A read enable timing signal REN, FIG. 6a, in the higher of its two voltage states, following the sampled servo gating signal SSGT, enables a data circuit 38 as the magnetic had enters the data field, which transmits data to the user 42 as requested by the host computer 14.

Figure 8:
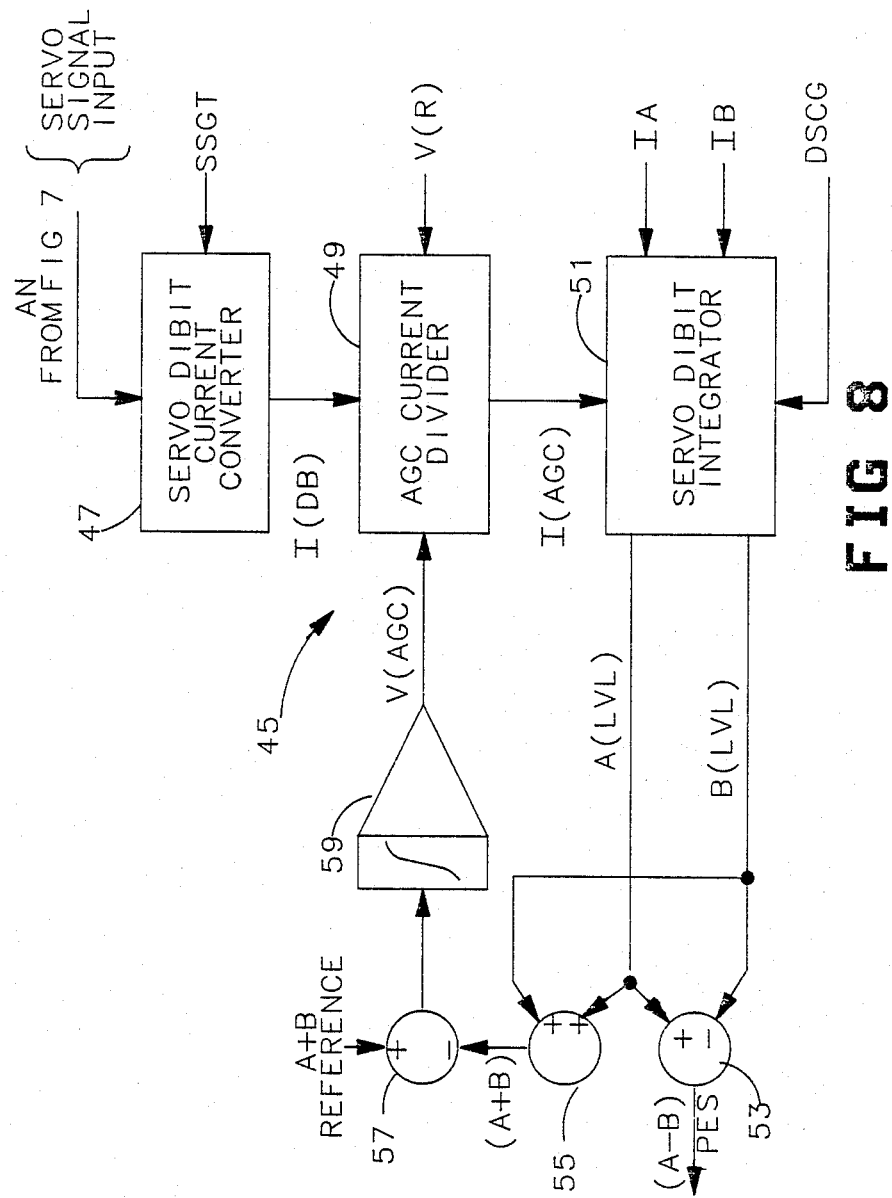
FIG. 8 is a block diagram of a position error circuit.

The position error signal demodulator 45 of FIG. 7 is illustrated in block diagram form in FIG. 8. It is a part of the servo system 16 of FIG. 1. The normalized signals, AN, from the automatic gain control amplifier of FIG. 7 are coupled as the servo signal input to a servo dibit current converter 47. This current converter is gated by the sampled servo gating signal SSGT (see FIGS. 6a and 6b) so that only the A and B track position servo code signals are processed. The output of this circuit 47 is a current I(DB) which is the dibit current developed only from the A and B signals. This current is coupled as an input to an AGC current divider 49 which has a second input V(AGC) coupled from a feedback loop and a reference input V(R), to achieve automatic gain control. Its output current is designated I(AGC). The A and B current signals I(AGC) from the AGC current divider 49 are coupled as input to a servo dibit integrater 51 which is gated by the signals IA and IB (see FIG. 6a and 6b), synchronously with the A and B signal input. This integrates the signals from the A and B track position servo fields, producing the A level and B level output signals A(LVL) and B(LVL). In practice, these signals are coupled to differential and summing amplifiers which are here represented as differential and summing circuits 53 and 55, respectively, for producing the position error signal (A−B) and the sum signal (A+B). The position error signal (A−B) is used in the track following control loop of servo system 16 to control the actuator 11 of FIG. 1, to position the head 5 on the center of a selected track. The signal (A+B) is compared with a reference signal (A+B reference) in the circuit 57, the output of which is coupled to an integrating amplifier 59, which provides the feedback V(AGC) to the automatic gain control current divider 49.

The servo dibit current converter 47 provides the output current I(DB), that is proportional to the amplitude of each A and B input signal. It functions as a half-wave rectifier. In this application it rectifies only the negative levels of the A and B servo signals to produce the current pulses I(DB).

Such a current converter may be implemented using a conventional PNP type transistor, which is base biased so that it is nonconducting or substantially nonconducting, and disabled by an inverter having an output coupled to the transistor emitter, which normally pulls the emitter voltage to a level below the base bias voltage. In the presence of the sampled servo gating signal SSGT, the inverter circuit permits the emitter voltage to rise so that the transistor can conduct. The A and B servo field voltages are AC coupled into the base of the transistor. The negative excursions cause the transistor to conduct to produce the current I(DB).

An AGC current divider such as the circuit 49, may include a differential pair of PNP transistors that divide the incoming current I(DB), and deliver some fraction of it as the output current I(AGC). The amount of the input current, I(DB) that is delivered as I(AGC) is controlled by the difference between the feedback voltage V(AGC), and a reference voltage V(R). V(R) is established at a nominal value compatible with the system.

The servo dibit integrater may comprise a PNP transistor pair, in which the signal I(AGC) is coupled to both emitters which are also clamped at a predetermined voltage. The collectors are individually capacitor coupled to ground. Fixed biases on the bases of these transistors bias them to cut off, or substantially to cut off. The signals IA and IB are coupled, respectively, to the transistor bases and switch the transistors synchronously with the individual A and B voltages of FIG. 6a, or with the A and B voltage groups of FIG. 6b. The A level and B level voltages, A(LVL) and B(LVL), are output buffered from the respective collector circuits of the transistors. The discharge signal DSCG controls individual switches in the collector circuits ahead of the capacitors, to couple the capacitors to ground, so that the capacitors may be discharged just prior to the time of the magnetic head transistion of the track position servo code.

The automatic gain control amplifier together with the sum and difference circuits 55 and 57 sums the A(LVL) and B(LVL) inputs to create the servo gain factor signal (A+B), which is compared to an A+B reference signal in the input circuit 57 to the integrater amplifier 59. The circuit 57 represents the positive and negative inputs to the integrater amplifier. The output voltage V(AGC) adjusts itself to whatever value is necessary so that the A(LVL) and B(LVL) signal sum will exactly match the desired reference level.

The differencing circuit 53 represents a conventional amplifier which generates a difference signal corresponding to A(LVL)−B(LVL). Thus when these two input signals are equal, the output voltage may be zero, or may be some predetermined voltage indicative of a head position at track center.

Circuits of the type discussed above are neither illustrated herein nor described in greater detail since their details are conventional and are not necessary to an understanding of this invention. Additionally such details have not been claimed. These circuits, however, are presently implemented as described.

Sector mark detection is essential to system timing. FIG. 6b illustrates the division of the sector mark into the 3 spaces described above, comprising in this example, a 1st space 5 bits long, a 2nd space 25 bits long and a 3rd space 5 bits long. The way in which this sector mark is detected is illustrated in the flow chart of FIG. 9.

Figure 9:
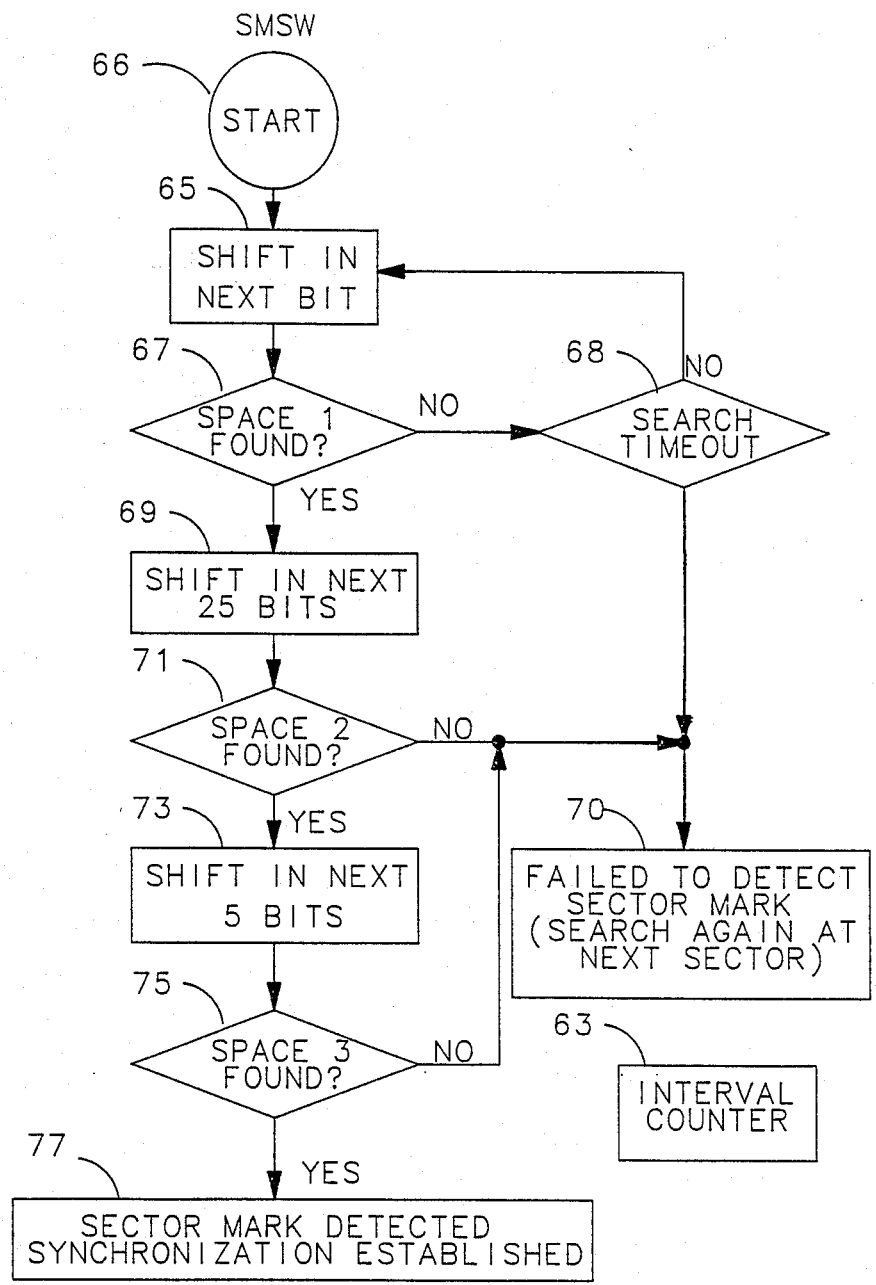
FIG. 9 is a flow chart illustrating the steps in detecting the sector mark in the servo gap.

The sector mark detection cycle begins while the magnetic head is still in the automatic gain control field. It is initiated by a sector mark search window signal 60 (SMSW), FIG. 6a, in the higher of its two voltage states. The search now begins for the 5 bit sector mark gap, space 1, at the beginning of the sector mark, which includes 4 zero bits and a 1 bit, 00001. The 1 bit results from dibit signal 62. Space 1 of the sector mark begins at the end of the AGC field, FIG. 6b. A bit time and time interval counter 63, FIG. 9, provides bit time counting and interval timing. Space 1 of the sector mark has been found if 00001 is counted in the space 1 time interval, space 2 of the sector mark has been found if 24 zeros and a 1 are counted in the time space 2 is scanned by the magnetic head. Bit count 1 is due to the dibit signal 64. Space 3 has been found if five zero bit counts, 00000, are counted during scanning.

Referring to FIG. 9, the search for the sector mark is initiated at the start block 66 by the sector mark search window signal 60. During the timing interval for space 1, monitored by the search timeout decision function 68, the signals from the AGC field are shifted in, shift function 65. A change in signal pattern from 1 to 0 indicates the beginning of space 1 which is confirmed by the zeros which follow. Bit time zeros are counted, 00001 indicating space 1 has been found, if counted within the space 1 time interval monitored by the search timeout decision function 68. This is the ideal case. A bit count of 00000 is also acceptable.

In the presence of the space 1 bit counts, decision function 67 initiates the shift function 69. The next 25 bits are now counted. Thereafter a correct bit count for space 2 enables the shift function 73 and the count for the five bit counts for space 3 is started. Otherwise the sector mark search is terminated by decision function 71 for space 2. Decision function 70 responding to the failure to detect space 2 defers the sector mark search until the next sector.

If the five bit counts for space 3 are all zeros, decision function 75 provides an indication to decision function 77 which determines that time synchronization has been established. Signal processing, in this circumstance, in the remainder of the servo gap continues. Otherwise the sector mark search is deferred until the next sector.

Other sector mark dibit configurations may be employed. That which has been illustrated and described has been implemented and is fault tolerant and is readily identifiable among other dibits patterns, especially the high density dibit pattern of the AGC field which precedes it in the servo gap.

This improved memory disc servo code format, system and method for normalizing signal amplitudes, with respect to its overall organization and with respect to the specific recording of the magnetic dibits of the servo code in the servo gap, provides several advantages.

The sampled servo code format in the servo gap provides the signals necessary for the system to maintain disc speed, to seek, to track follow, and to perform head switches. No dedicated servo surface or other encoders are required.

The embedded sampled servo and its utilization eliminates problems associated with mechanical and thermal head offsets. Therefore, the data head is more closely centered over the data track.

Any amount of radial head misalignment can be tolerated by using the Gray coded track addresses because during a head switching operation, the search is made for a particular track number at which track centering takes place.

Significant amounts of circumferential head misalignment, called skew, can be tolerated due to timing recovery from the sector mark pattern. Thus, there is no need to try to determine a correction necessary for a particular circumferential head skew due to misalignment, due to tilting of the carriage or due to tilt of the disc spindle, or all of these.

The use of the defect bit in the servo gap eliminates the need for a flawless disc surface. The presence of the defect bit, when sensed by the magnetic head results in skipping of the next sector.

In some disc drives, there is a need to move the heads to the inner diameter or the outer diameter guard bands to obtain synchronization lock with the disc signals. This is not necessary with the present servo gap formatting. The sector mark pattern provides such a function.

In some disc drives, there's a requirement to recalibrate the system in order to find track zero. Such a recalibration operation is not necessary with the present arrangement since the track addresses are now read directly.

The servo signal is never lost due to signal amplitude fluctuations when switching from one head to another because the AGC field provides a signal that is used to reestablish the correct signal amplitude before processing the remainder of the servo gap.

What is claimed is:

1. In a magnetic disc drive, the improvement comprising:
   a. a rotatable magnetic memory disc having a plurality of concentric circular tracks which are each divided into sectors, each sector being radially aligned with sectors in adjacent tracks, each sector having a servo gap which is radially aligned with servo gaps in adjacent tracks in that sector; and
   b. an automatic gain control filed in each servo gap, having magnetic dibits which have a radial length less than one-half of the distance between the centers of adjacent tracks, disposed in uniformly circumferentially spaced positions, in radially spaced, end-to-end alignment with each other, in half-track positions on each side of the center of the tracks; whereby a magnetic head traversing the automatic gain control field, overlaps substantially the same amount of magnetic dibit, whether or not positioned at the center of a track.

2. In a magnetic disc drive having a magnetic memory disc provided with a plurality of concentric circular tracks which are divided into sectors, the method for magnetic dibit recording of separate magnetic dibit fields for forming a servo gap in each sector, comprising:
   a. providing a magnetic head having a width corresponding to the width of track; and
   b. recording with said magnetic head separate magnetic dibit fields in half-track radial steps, placing pairs of said magnetic dibits in selected circumferentially spaced positions, in radial half-track alignment in positions between track centers.

3. The method according to claim 2, comprising:
   a. recording one of said separate magnetic dibit fields as an automatic gain control field at the beginning of said servo gap; and
   b. recording a second of said separate magnetic dibit fields as a sector mark of identical dibit patterns in each track adjacent to and following said automatic gain control field.

4. The method of claim 3, in which:
   a. the magnetic dibits of said automatic gain control field are uniformly circumferentially spaced.

5. In a magnetic disc drive, the improvement comprising:
   a. a magnetic memory disc having a plurality of circular tracks which are divided into sectors, each sector being radially aligned with sectors in adjacent tracks, each sector having a servo gap which is radially aligned with servo gaps in adjacent tracks in that sector;
   b. a plurality of magnetic dibit fields of differing formats defining sectors within each servo gap;
   c. each magnetic dibit field comprising magnetic dibits which are radially disposed of said tracks, which magnetic dibits have a radial length less than one-half the distance between the centers of adjacent tracks, which magnetic dibits are radially positioned in pairs in spaced end-to-end relationship between said spaced from the centers of adjacent tracks, and which pairs of magnetic dibits on opposite sides of the centers of said tracks are selectively circumferentially spaced to form said magnetic dibit fields of differing formats.

6. A magnetic memory disc according to claim 5, in which:
   a. one of said magnetic dibit fields is an automatic gain control field of a format in which circumferential spacing of the pairs of magnetic dibits is uniform and the pairs of magnetic dibits on one side of the center of each track are radially aligned with pairs of magnetic dibits on the opposite side of the center each track.

7. A magnetic memory disc according to claim 5, in which:
   a. one of said magnetic dibit fields is a track position servo field of a format in which circumferential spacing of the pairs of magnetic dibits is uniform and the pairs of magnetic dibits on one side of the center of a track are circumferentially positioned substantially midway between adjacent pairs of magnetic dibits on the opposite side of the center of that track.

8. A magnetic memory disc according to claim 5, in which one of said magnetic dibit fields is a track position servo field of a format in which said pairs of said magnetic dibits are uniformly circumferentially spaced in groups on opposite sides of the center of a track, one group being circumferentially spaced from the group on the opposite side of that track.

9. In a magnetic disc drive, the improvement comprising:
   a. a magnetic memory disc having a plurality of circular tracks thereon, each circular track having a sevo gap therein disposed in radial alignment with servo gaps in adjacent tracks;
   b. an automatic gain control field and a track position servo field in circumferentially spaced positions in each servo gap and respectively, radially aligned with automatic gain control fields and track position servo fields in adjacent tracks; and
   c. pairs of half-track magnetic dibits disposed in selected circumferential positions, in radially aligned, spaced end-to-end positions disposed between and spaced from adjacent track centers in both said automatic gain control field and said track position servo field.

* * * * *

UNITED STATES PATENT AND TRADEMARK OFFICE
CERTIFICATE OF CORRECTION

PATENT NO. : 4,823,212

DATED : April 18, 1989

INVENTOR(S) : Vernon L. Knowles and Robert E. Kier

It is certified that error appears in the above-identified patent and that said Letters Patent is hereby corrected as shown below:

Column 2, line 63 of the Patent, after "each", delete "tack" insert --track--.

Column 9, line 22 of the Patent, after "Fig.", insert --6a--.

Column 10, line 12 of the Patent, after "Fig.", insert --1--.

Column 10, line 16 of the Patent, after "magnetic", delete "had", insert --head--.

In Claim 1, Column 13, line 27 of the Patent, after "control", delete "filed", insert --field--.

In Claim 5, Column 14, line 15 of the Patent, after "between", delete "said", insert --and--.

Signed and Sealed this

Seventeenth Day of April, 1990

*Attest:*

HARRY F. MANBECK, JR.

*Attesting Officer*  *Commissioner of Patents and Trademarks*